Figure 1:
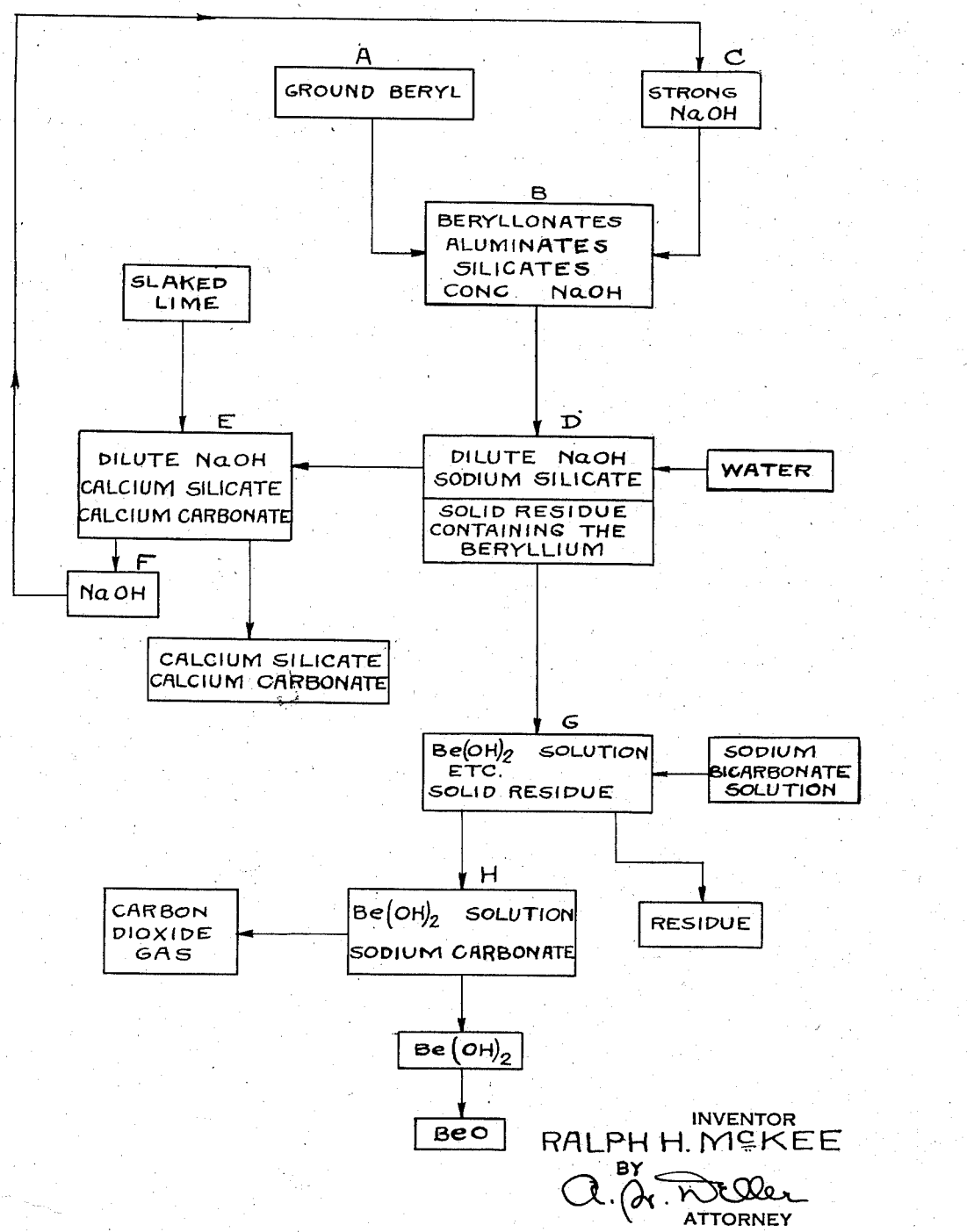

Oct. 13, 1942.    R. H. McKEE    2,298,800
PROCESS FOR THE PRODUCTION OF BERYLLIUM OXIDE OR HYDROXIDE
Filed May 26, 1939    2 Sheets-Sheet 2

INVENTOR
RALPH H. McKEE

Patented Oct. 13, 1942

2,298,800

UNITED STATES PATENT OFFICE 2,298,800

PROCESS FOR THE PRODUCTION OF BERYLLIUM OXIDE OR HYDROXIDE

Ralph H. McKee, New York, N. Y.

Application May 26, 1939, Serial No. 275,846

7 Claims. (Cl. 23—24)

The present invention relates to a process for producing beryllium oxide or hydroxide from beryllium ores, and, more particularly, to a method of producing from beryllium minerals the oxide or hydroxide of beryllium in great purity on an industrial scale.

Heretofore, the methods used in the production of beryllium oxide or beryllium hydroxide required either high temperatures, large amounts of chemicals, many operations, difficult operations, or a combination of these. These methods in some cases required expensive equipment to avoid corrosion. In general all were expensive in both materials and equipment required.

In one method the ore was melted and quenched in water. The shattered ore after grinding was digested at 300° C. with sulfuric acid to dissolve beryllium, aluminum, and iron as sulfates, leaving silica behind. Aluminum was separated as an alum, and beryllium sulfate separated out from the ferric sulfate solution.

Another method consisted in heating ground beryl with a fluoride to form a soluble sodium beryllium fluoride and insoluble silica and sodium aluminum fluoride. The beryllium content was then removed by extracting with water.

In another method beryl was decomposed with a fused alkali or a heated strong solution of sodium hydroxide. Treatment with sulfuric acid gave a solution of beryllium, aluminum, and iron sulfates and a residue of silica. From this solution beryllium sulfate was separated by fractional crystallization.

Another method was to treat the ground beryl with hydrofluoric acid, filter from the insoluble residue and evaporate the beryllium fluoride solution to give an impure beryllium fluoride salt. Such a process obviously was accompanied by many corrosion difficulties.

Although the shortcomings of the prior art were recognized and although experimenters in this field have struggled for many years to find cheaper and less corrosive methods and those which would produce beryllium oxide or hydroxide in a pure state, none, so far as I am aware, has satisfactorily solved this problem.

It is an object of the present invention to produce from beryllium minerals the oxide or hydroxide of beryllium by a process adaptable to easy, cheap and practicable manufacture of said beryllium oxide or hydroxide in relatively simple and inexpensive apparatus.

It is another object of my invention to produce beryllium oxide or hydroxide from the ores of beryllium by a process which uses a small amount of relatively inexpensive chemical reagents and largely recovers even these for reuse.

It is also an object of the present invention to produce beryllium oxide or hydroxide from beryllium ores by a process which avoids the use of relatively high temperatures of operation and which operates efficiently and satisfactorily at temperatures no greater than those readily available by the use of steam under ordinary pressures.

A further object of my invention is to produce beryllium oxide or hydroxide from minerals containing beryllium by methods which avoid the use of strong acids and other corrosive chemical agents, such as free halogens or hydrohalides, especially at high temperatures.

It is also within the contemplation of this invention to produce beryllium oxide or beryllium hydroxide from beryllium ores by a process which separates beryllium from the aluminum with which it ordinarily occurs by employing the selective dissolving action of a neutral hydrotropic solution instead of the expensive and corrosive agents of the prior art.

My invention also contemplates the production of a solution of beryllium hydroxide from beryllium ores, without resorting to fusion or high temperatures, by dissolving said beryllium hydroxide in a hydrotropic solution.

My invention further provides a method of producing beryllium oxide or hydroxide from beryllium-bearing minerals by separating beryllium hydroxide from the hydroxides of aluminum and iron by dissolving the beryllium hydroxide in a sodium bicarbonate solution.

Furthermore, my invention provides a method of extracting beryllium directly from the ore, after its decomposition by alkali, with a sodium bicarbonate solution.

Another object of the invention is to produce beryllium oxide which is at least 99% pure.

Figure 2:
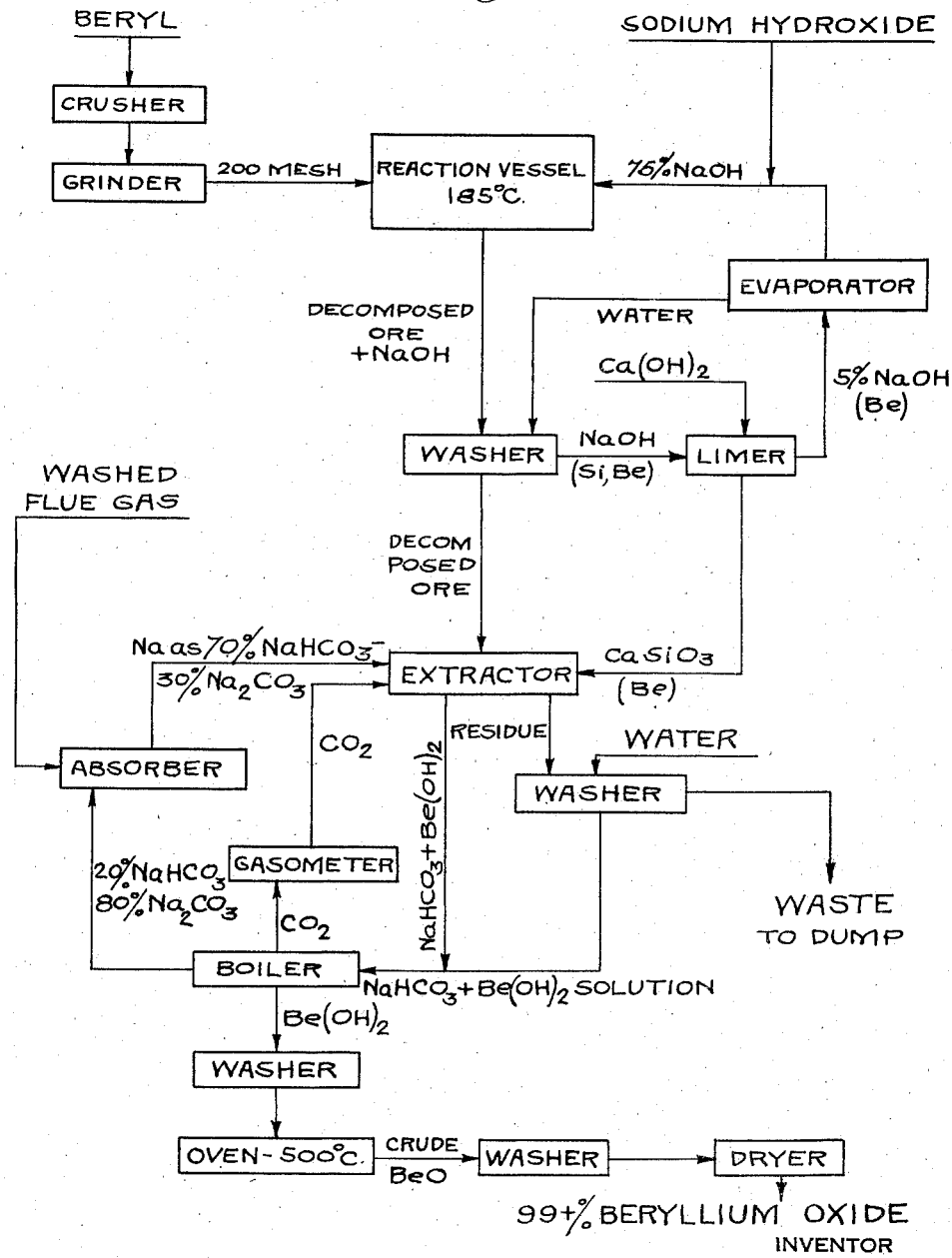

Other objects and advantages of my invention will become apparent from the following description taken in conjunction with the accompanying drawings, in which:

Fig. 1 illustrates a material flowsheet of a method for carrying the present invention into practice; and Fig. 2 is a process flowsheet of a preferred embodiment of the present invention.

Broadly stated, my present invention contemplates a process of producing beryllium oxide or hydroxide which comprises reacting beryllium-bearing minerals, such as beryl, phenacite, beryllonite, or chrysoberyl, with a strong caustic alkali solution and dissolving beryllium hydroxide in a hydrotropic solution, while leaving as a residue the other constituents of the ore, viz., alumina, silica, etc. In practice, certain economies and the recovery of chemicals for reuse are employed and these are largely shown on the accompanying flowsheets.

Beryllium hydroxide (or oxide) is produced from a beryllium mineral by heating the ground mineral at about 150° to about 225° C. with an alkali, dissolving from the decomposed ore the beryllium hydroxide by the use of a solution of sodium bicarbonate, either added or formed in place, filtering, reprecipitating the dissolved beryllium hydroxide by heat or dilution, and then filtering, washing, and drying (or heating) the thus precipitated beryllium hydroxide.

I have discovered that sodium bicarbonate solution of about 5% to about 14% concentration, when employed as the hydrotropic solution in my process, can be used to extract the beryllium directly from the ore, which has been heated with strong alkali, without the use of acids such as sulfuric acid. The bicarbonate solution has the advantage that it does not dissolve aluminum, iron, or silica, although it is an excellent solvent for beryllium hydroxide. In place of sodium bicarbonate solution, I have found that other hydrotropic solutions may be used as equivalents, for example, solutions of potassium or an amine (alkyl ammonium) bicarbonate, ammonium or amine (alkyl ammonium) carbonate, ammonium, sodium, potassium, or amine (alkyl ammonium) oxalate or salicylate. However, although the application of heat is sufficient to precipitate beryllium hydroxide from a potassium bicarbonate solution by volatilizing part of the contained carbon dioxide, and from a solution of ammonium carbonate by volatilizing both ammonia and carbon dioxide, the oxalate and the salicylate ions cannot be volatilized by heating their solutions. With these salts of non-volatile acids, one can best remove the acid group from the solution by precipitating the organic acid by the addition of a mineral acid, such as sulfuric acid, filtering off the organic acid crystals, and then precipitating the beryllium hydroxide by making the beryllium sulfate solution alkaline. The crude beryllium hydroxide thus formed may then be purified by means well known to those skilled in the art.

Although it has previously been known that freshly precipitated beryllium hydroxide will dissolve in sodium bicarbonate solution and will be reprecipitated when the bicarbonate is changed to carbonate by boiling, it was not known that such a solution would dissolve beryllium hydroxide from the ground ore after heating with a strong solution of caustic alkali. The prior art put beryllium minerals into a condition for processing by fusing them with an alkali at temperatures of 500° C. or higher. The amount of beryllium dissolved by a 10% sodium bicarbonate solution in a few hours from such fused mixtures, say of ground beryl and caustic soda, is too small to be of interest commercially. However, I have found that if such fused mixtures are heated with water for a considerable time then a sodium bicarbonate solution will dissolve substantial proportions of the beryllium content of the mixture.

Although the precipitate formed on heating a bicarbonate solution is commonly considered to be beryllium hydroxide and is so designated in the appended claims, on closer examination it is always found to contain an alkali carbonate and may possibly be in part a sodium beryllium carbonate, or it may simply be beryllium hydroxide which has adsorbed considerable quantities of an alkali carbonate. Many formulas have been suggested, but it is unlikely that any pure or true compound exists between beryllium hydroxide and sodium carbonate or bicarbonate. However, it makes no difference what the actual composition is, for, on heating, beryllium oxide is formed, from which the alkali carbonate may readily be removed by washing, leaving a pure beryllium oxide of marketable quality. Beryllium oxide produced by this process may readily attain a purity of over 99%. The same purity is obtained when the beryllium is precipitated as beryllium hydroxide by dilution to about 2% concentration of the sodium bicarbonate solution of about 5% to about 14% concentration used as a solvent.

For the purpose of giving those skilled in the art a better understanding of my present invention, the following illustrative examples of carrying the invention into practice are given, with reference to the flowsheet depicted in Fig. 1.

*Example No. I*

I introduce from storage A into kettle B about 100 pounds of commercial beryl ore, having a BeO content of about 10.5% and ground to a fineness where about 50% passes through a screen having 200 meshes per linear inch and substantially all passes through a screen having 100 meshes per linear inch. The ground ore is there stirred at about 175° to about 185° C. with about 330 pounds of a commercial solution of caustic soda of about 75% strength, which is run in from heated tank C. The heating and slow stirring are continued for about 20 to about 24 hours, whereafter the contents of kettle B are poured into a tank D, equipped with stirring means and containing about 600 gallons of water at about ordinary room temperature. The whole is stirred until substantially all of the lumps are broken up, and the suspension is then allowed to settle. By using this amount of water, the resulting alkali solution is so dilute that only traces of beryllium are in solution. The supernatant liquid is drawn off into a tank E, and the silicates or carbonates dissolved therein are precipitated by the addition of lime. This is filtered, and the filtrate, a dilute sodium hydroxide solution, is transferred to an evaporator F, where it is concentrated. Thereafter, it may be put into tank C for reuse in the process.

The solid residue remaining in tank D is washed with a small amount of water and transferred to a vessel G where it is then treated with about 1000 pounds of about a 10% solution of sodium bicarbonate. This solution dissolves the beryllium as beryllium hydroxide but does not dissolve the other constituents of the ore. The temperature of this operation is maintained at about 25° C. and for about 16 hours. This solution is then filtered, the filtrate going to kettle H to be boiled. On boiling, carbon dioxide is evolved as a gas, and beryllium hydroxide is precipitated as a granular, easily filtered solid, containing some sodium carbonate. After washing with water, it is dried, heated for a short time to about 500° C. to change it to beryllium oxide, washed with water to remove any contained sodium carbonate, and dried. It then has a purity of above about 99% beryllium oxide.

Fig. 2 is a detailed process flowsheet addressed to the above example. In this flowsheet preferred conditions as to particle size, temperature, and concentrations are particularized, and the equipment preferably employed in order to effect economies in operation is indicated.

Example No. II

As a second example, I can use a weaker solution of sodium hydroxide for decomposing the beryl. In this case about 500 pounds of about a 50% sodium hydroxide solution are added to about 100 pounds of ground beryl. This mixture is heated under some pressure in a closed stirred vessel at about 225° C. for about 12 hours. After the heating it is diluted with about 600 gallons of cold water and the excess alkali is removed by filtration. The residue is stirred with about 600 pounds of about a 14% sodium bicarbonate solution at about 50° C. for about 7 hours, whereby beryllium hydroxide is dissolved and recovered as described in Example No. I.

It will be observed that my present process employing strong caustic alkali and hydrotropic solutions satisfactorily eliminates the use of acids or halides and the high temperature, fusion, and fractional crystallization methods of producing beryllium oxide or hydroxide from the ores of beryllium used by the prior art. By the term "hydrotropic solutions" used in describing my improved process, I mean those aqueous salt solutions which effect greater solubility of slightly soluble substances than does pure water of the same temperature.

Although my invention is described in connection with preferred embodiments, it will be observed that variations may be resorted to and are within the purview of the appended claims. For example, after the treatment with strong alkali and the dilution of the resultant mixture with water and the removal of part of the alkali by decantation, carbon dioxide may be passed through the remaining slurry to convert the residual alkali to bicarbonate, and the bicarbonate solution carrying the beryllium may be removed by filtration and then heated, as before, to precipitate the beryllium.

I claim:

1. The process of producing beryllium hydroxide which comprises heating a finely ground beryllium-bearing mineral at about 225° C. for about 12 hours with a solution of sodium hydroxide of about 50% concentration, thereby producing a mixture containing beryllium hydroxide and residual alkali, agitating said mixture during said heating, thereafter adding water to said mixture, agitating to form a slurry containing a residue, filtering to remove the residual alkali solution and to leave the residue containing beryllium hydroxide, treating the residue at about 50° C. with an approximately 14% solution of sodium bicarbonate for about 7 hours whereby beryllium hydroxide is dissolved therefrom, filtering said solution whereby a filtrate containing beryllium in solution is obtained, and precipitating beryllium hydroxide therefrom.

2. The process of producing beryllium hydroxide from beryllium minerals which comprises heating a finely ground beryllium-bearing mineral under pressure at about 225° C. for about 12 hours with about 5 times its weight of a solution of sodium hydroxide of about 50% concentration, thereby producing a mixture containing beryllium hydroxide and residual alkali, agitating said mixture during said heating, thereafter agitating said mixture with an amount of water of about 50 times the weight of the beryllium-bearing mineral to form a slurry containing a residual solid, filtering to remove the residual alkali solution and to leave the residual solid containing beryllium hydroxide, maintaining said residual solid in contact for about 7 hours with an approximately 14% solution of sodium bicarbonate amounting to about 6 times the weight of the beryllium-bearing mineral whereby beryllium hydroxide is dissolved from said residual solid, agitating during said contact, filtering to obtain a filtrate containing beryllium in solution, boiling said filtrate to remove carbon dioxide and to precipitate beryllium hydroxide therefrom, and recovering the thus precipitated beryllium hydroxide.

3. The process of producing beryllium hydroxide from beryllium-bearing minerals, which comprises comminuting the beryllium-bearing minerals, mixing a mass of said comminuted beryllium-bearing minerals with an aqueous solution of an alkali hydroxide of about 50% to 75% concentration to form a pulp, heating said pulp at about 150° C. to about 225° C. for about 12 hours to dissolve siliceous matter and carbonates thereby producing a mixture of beryllium hydroxide-containing residue, a solution containing siliceous matter and carbonates and residual alkali hydroxide, separating the beryllium hydroxide-containing residue from said mixture, treating said beryllium hydroxide-containing residue with an aqueous solution of sodium bicarbonate to dissolve the beryllium hydroxide therefrom without the use of acids, filtering to obtain a filtrate containing beryllium in solution, and precipitating beryllium hydroxide therefrom.

4. The process of producing beryllium hydroxide from beryllium-bearing minerals, which comprises comminuting the beryllium-bearing minerals, mixing a mass of said comminuted beryllium-bearing minerals with an aqueous solution of an alkali hydroxide of about 75% concentration to form a pulp, heating said pulp at about 175° C. to about 185° C. for about 12 hours to dissolve siliceous matter and carbonates thereby producing a mixture of beryllium hydroxide-containing residue, a solution containing siliceous matter and carbonates and residual alkali hydroxide, separating the beryllium hydroxide-containing residue from said mixture, treating said beryllium hydroxide-containing residue with an aqueous solution of sodium bicarbonate to dissolve beryllium hydroxide therefrom without the use of acids, filtering to obtain a filtrate containing beryllium in solution, and precipitating beryllium hydroxide therefrom.

5. The process of producing beryllium hydroxide from beryllium-bearing minerals, which comprises comminuting the beryllium-bearing minerals, mixing a mass of said comminuted beryllium-bearing minerals with an aqueous solution of an alkali hydroxide of about 50% concentration to form a pulp, heating said pulp at about 225° C. for about 12 hours to dissolve siliceous matter and carbonates thereby producing a mixture of beryllium hydroxide-containing residue, a solution containing siliceous matter and carbonates and residual alkali hydroxide, separating the beryllium hydroxide-containing residue from said mixture, treating said beryllium hydroxide-containing residue with an aqueous solution of sodium bicarbonate to dissolve the beryllium hydroxide therefrom without the use of acids, filtering to obtain a filtrate containing beryllium in solution, and precipitating beryllium hydroxide therefrom.

6. The process of producing beryllium hydroxide from beryllium-bearing minerals, which comprises comminuting the beryllium-bearing minerals, mixing a mass of said comminuted beryllium-bearing minerals with an aqueous solution of an alkali hydroxide of about 50% concentration to form a pulp, heating said pulp under pressure at about 225° C. for about 12 hours to dissolve siliceous matter and carbonates thereby producing a mixture of beryllium hydroxide-containing residue, a solution containing siliceous matter and carbonates and residual alkali hydroxide, separating the beryllium hydroxide-containing residue from said mixture, treating said beryllium hydroxide-containing residue with an aqueous solution of sodium bicarbonate to dissolve the beryllium hydroxide therefrom without the use of acids, filtering to obtain a filtrate containing beryllium in solution, and precipitating beryllium hydroxide therefrom.

7. The process of producing beryllium hydroxide from beryllium-bearing minerals, which comprises comminuting the beryllium-bearing minerals, mixing a mass of said comminuted beryllium-bearing minerals with about 3 to about 3½ times its weight of an aqueous solution of an alkali hydroxide of about 75% concentration to form a pulp, heating said pulp at about 185° C. for about 24 hours to dissolve siliceous matter and carbonates thereby producing a mixture of beryllium hydroxide-containing residue and residual alkali hydroxide, filtering the beryllium hydroxide-containing residue from said mixture, treating said beryllium hydroxide-containing residue with an aqueous solution of sodium bicarbonate to dissolve the beryllium hydroxide therefrom without the use of acids, filtering to obtain a filtrate containing beryllium in solution, and precipitating beryllium hydroxide therefrom.

RALPH H. McKEE.